United States Patent [19]
Omi

[11] Patent Number: 5,515,201
[45] Date of Patent: May 7, 1996

[54] MICROSCOPE-TELESCOPE COMBINATION FITTED WITH ILLUMINATING APPARATUS

[75] Inventor: Shoichi Omi, Tokyo, Japan

[73] Assignee: Lunax Company Limited, Ibaraki, Japan

[21] Appl. No.: 513,596

[22] Filed: Aug. 10, 1995

Related U.S. Application Data

[63] Continuation of Ser. No. 110,806, Aug. 23, 1993, abandoned.

[30] Foreign Application Priority Data

Aug. 28, 1992 [JP] Japan ................... 4-230425

[51] Int. Cl.$^6$ ............................... G02B 21/06
[52] U.S. Cl. .................. 359/385; 359/399; 359/368; 359/391
[58] Field of Search ................... 359/385, 399, 359/368, 391

[56] References Cited

U.S. PATENT DOCUMENTS 5,052,788  10/1991  Tachibana ............... 359/391

FOREIGN PATENT DOCUMENTS 2217471  10/1989  Japan ..................... 359/399

Primary Examiner—Vincent P. McGraw
Assistant Examiner—K. P. Hantis
Attorney, Agent, or Firm—Popham, Haik, Schnobrich & Kaufman, Ltd.

[57] ABSTRACT

A microscope-telescope combination fitted with an illumination apparatus of a compact and simple structure having an illumination apparatus is effectively applicable both as the illumination for the microscope and as the flashlight. A microscope-telescope combination is fitted with an illuminating apparatus comprising of a telescope optical system, an auxiliary objection lens for forming a microscope optical system arranged so as to be projected into and retracted from the front of said objective lens of said telescope optical system, and a light source supported so that its illuminaing direction is changeable to a first direction parallel to an optical axis of said telescope optical system and to a second direction directing toward an observation position of said microscope optical system.

7 Claims, 2 Drawing Sheets

MICROSCOPE-TELESCOPE COMBINATION FITTED WITH ILLUMINATING APPARATUS

This is a continuation of U.S. patent application Ser. No. 08/110,806, filed Aug. 23, 1993, now abandoned.

BACKGROUND OF THE INVENTION

1. Field of the Invention

The present invention relates generally to a microscope-telescope combination and more specifically to a microscope-telescope combination fitted with an illuminating apparatus for the microscope.

2. Description of Background Art

In the prior art, there is one type of a microscope fitted with an illuminating apparatus in which the illuminating system is arranged at a side or a periphery of the microscope optical system to reflectively illuminate a specimen, or the other type in which the illuminating system is arranged opposite the microscope optical system to directly illuminate the specimen.

On the other hand, in the prior art microscope-telescope combinations, the microscope optical system is formed by projecting an auxiliary objective lens into the telescope optical system and the illuminating apparatus for the microscope optical system is immovably arranged at a side of the telescope and microscope system.

For such a microscope-telescope combination, it is required that each function of the microscope and the telescope can be effectively performed in addition to the convenience in portability and simplicity in operation. Although the prior art microscope-telescope combination is compact and has an illuminating apparatus having both the function of an illumination for the microscope and a flashlight, the illuminating apparatus is immovably mounted on the body and the illuminating direction is always constant and not changeable. Accordingly the illuminating apparatus of the prior art cannot be effectively used both for the illumination for the microscope and as a flashlight.

SUMMARY OF THE INVENTION

It is therefore an object of the present invention to provide a microscope-telescope combination fitted with an illumination apparatus having a compact and simple structure which can solve the problems of the prior art and has an illumination apparatus effectively applicable as both the illumination for the microscope and as a flashlight.

A second object of the present invention is to provide a microscope-telescope combination fitted with an illumination which is convenient for handling and has a hood fitted with a magnifier.

According to the present invention there is provided a microscope-telescope combination fitted with an illuminating apparatus comprising a telescope optical system, an auxiliary objection lens for forming a microscope optical system arranged to be projected into and retracted from the front of said objective lens of said telescope optical system, and a light source supported so that its illuminaing direction is changeable to a first direction parallel to an optical axis of said telescope optical system and to a second direction directing toward an observation position of said microscope optical system.

Also according to the present invention there is provided a microscope-telescope combination fitted with an illuminating apparatus comprising a telescope optical system, an auxiliary objective lens for forming a microscope optical system arranged to be projected into and retracted from the front of said objective lens of said telescope optical system, a light source for illuminating an observation position of said microscope optical system, and a hood fitted with a magnifier arranged in front of said objective lens.

It is possible to use the illuminating apparatus of the present invention as a flashlight by directing the illuminating direction of the light source toward the first direction parallel to the optical axis of said telescope optical system and as the illuminating apparatus for the microscope by directing the illuminating direction of the light source toward the second direction directed to an observation position of said microscope optical system. In addition, it is possible to effectively carry out the observation at a lower magnification than the microscope by use of the magnifier integrally formed in the hood.

BRIEF DESCRIPTION OF THE DRAWINGS

A preferred embodiment of the present invention will be hereinafter described with reference to accompanying drawings in which.

DESCRIPTION OF THE PREFERRED EMBODIMENT

Figure 1:
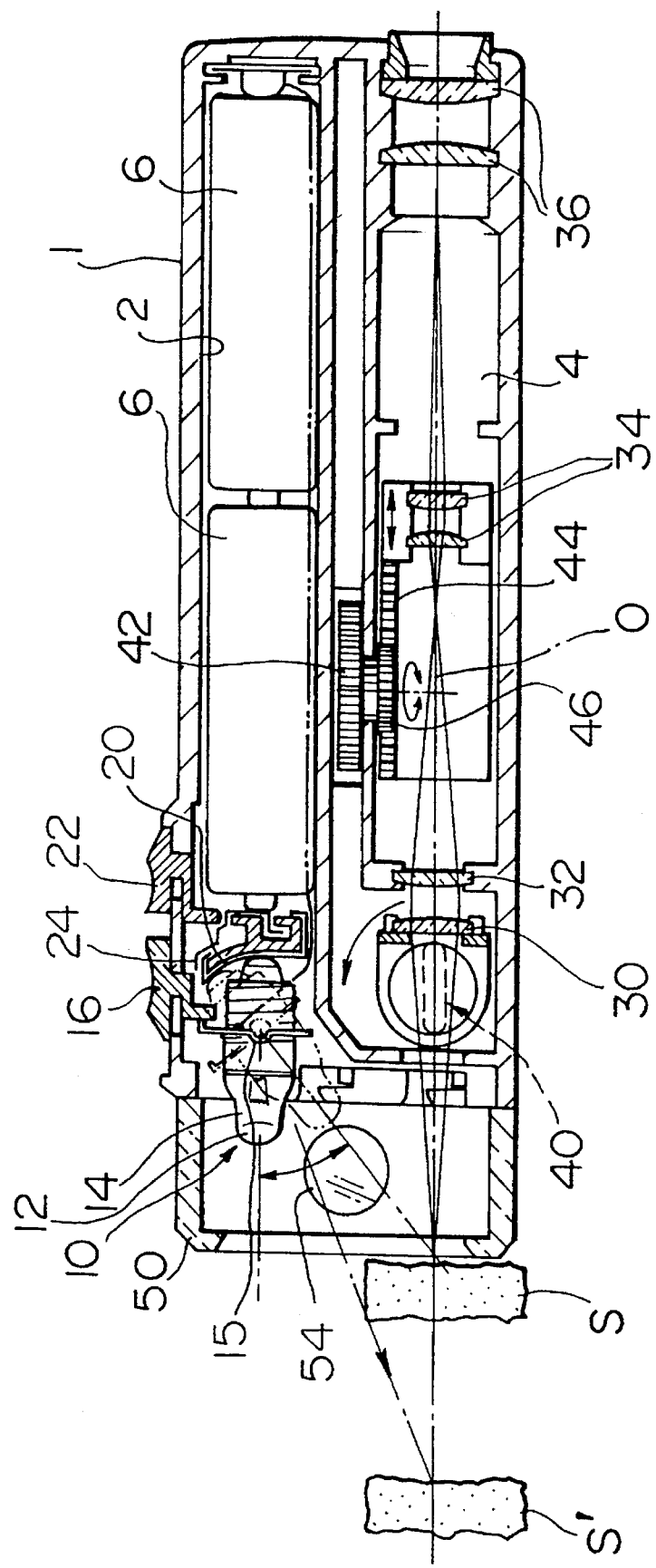
FIG. 1 is a longitudinal cross-section view of one preferred embodiment of a microscope-telescope combination fitted with an illuminating apparatus of the present invention.

One preferred embodiment of a microscope-telescope combination fitted with an illuminating apparatus of the present invention will be hereinafter described with reference to FIGS. 1 and 2. A substantially rectangular parallelepiped housing 1 is divided into an upper battery chamber 2 and a lower optical system chamber 4. The battery chamber 2 contains two UM-3 batteries 6 in series and is covered by a lid member 5.

An illuminating apparatus 10 is arranged in front of the battery chamber 2. The illuminating apparatus 10 has a lamp 14 fitted with a condensor lens 12, the lamp 14 being supported by a shaft member 15 so as to be moved by an illuminating direction selector lever 16. A side terminal of the lamp 14 is connected to a negative (−) side of the batteries 6 via a negative connector member (not shown) and a rear terminal of the lamp 14 is adapted to be slid on a circular arc-shaped positive (+) terminal 20 having its center on the pivotal center of the lamp 14. The circular arc-shaped positive terminal 20 is combined with a switching member 24 which actuates the "ON-OFF" of the lamp 14 by the operation of an illumination switch 22.

Figure 2:
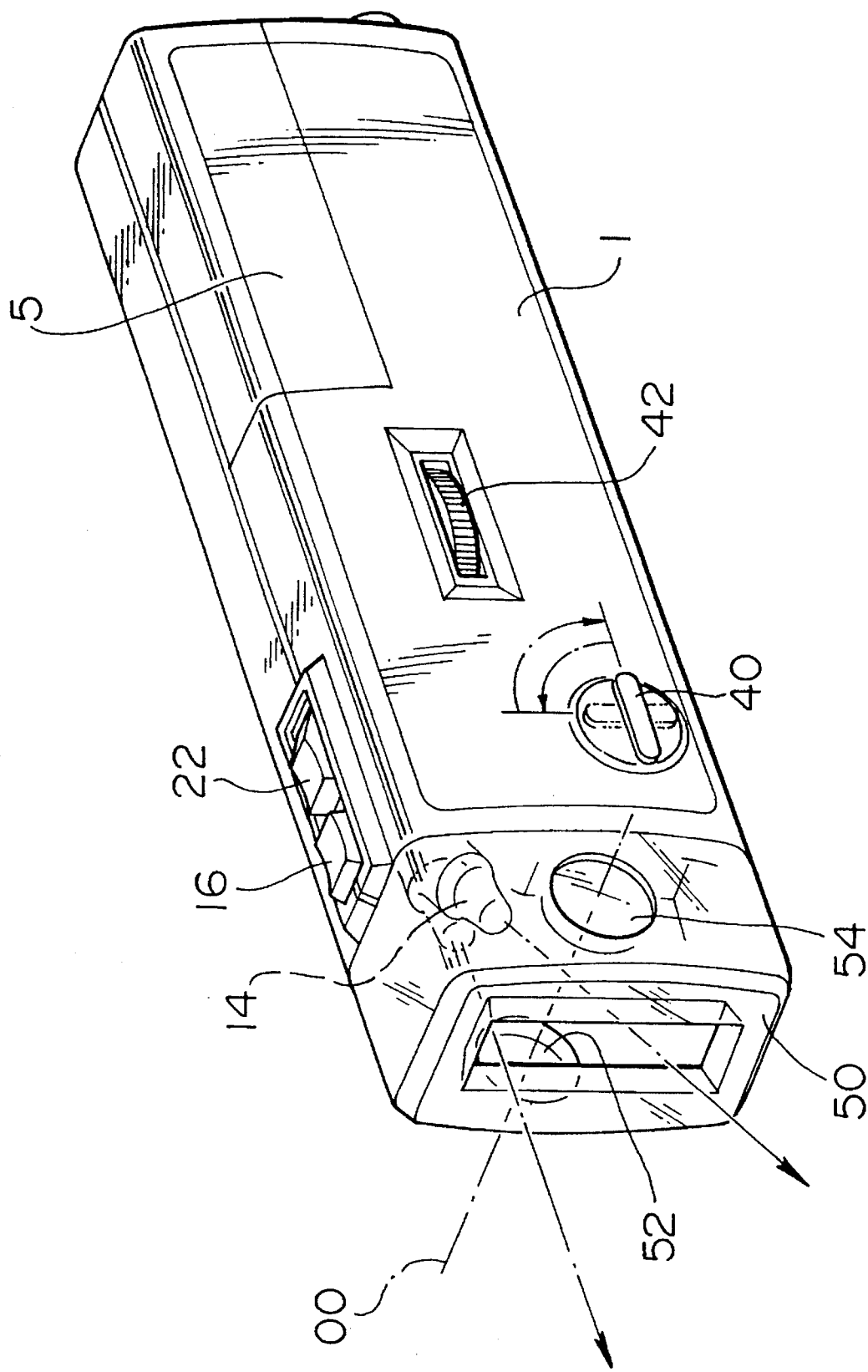
FIG. 2 is a perspective view of the microscope-telescope combination fitted with an illuminating apparatus of FIG. 1.

There are arranged on an optical axis "O" within the optical system chamber 4, an auxiliary lens 30 for the microscope, an objection lens 32, an erect focusing lens set 34 including a pair of convex lenses, and an ocular (eyepiece) 36, respectively in order from the left to the right of FIGS. 1 and 2. The auxiliary lens 30 for the microscope is mounted on a microscope/telescope selector knob 40 and is arranged so that it can be projected into and retracted from the optical axis "O" by turning the knob 40. On the other hand, the erect focusing lens 34 can be slid on the optical axis "O" via a rack 44 and a pinion 46 by rotating a focusing knob 42.

A hood 50 of transparent acrylic resin is attached to the front of the housing 1 or the lamp 14. One object of the hood 50 is to use it as a stand for the microscope-telescope combination of the present invention when it is used as a microscope in an upstanding position. In addition, two convex lenses 52 and 54 are formed on the hood 50. These convex lenses 52 and 54 have a common optical axis "OO" lying in place crossing perpendicularly to the optical axis "O" and can be used as magnifiers for observation at a lower magnification than the microscope.

In such a construction described above, it is possible to switch the lamp 14 "ON" or "OFF" by operating the illumination switch 22. Also it is possible to change the illuminating direction of the lamp 14 by operating the illuminating direction selector lever 16. When being used as the flashlight, the lamp 14 is positioned so that its beam travels in parallel with the optical axis "O" as shown by a solid line in FIG. 1 and when being used as the microscope, the lamp 14 is positioned so that its beam illuminates a specimen "S" placed on the optical axis "O" as shown by a dotted line in FIG. 1. The illuminating direction of the lamp 14 can be set in any desired direction such that the lamp 14 illuminates a specimen "S"'.

The selection of either the microscope or the telescope is achieved by turning the microscope/telescope selector knob 40 so that the auxiliary lens 30 for the microscope can be projected into or can be retracted from the optical axis "O". The focusing of the microscope and the telescope is achieved by rotating the focusing knob 42 to move the erect focusing lens 34 along the optical axis "O".

As another embodiment, the lamp 14 may be immovably mounted so that it forms a light source for illuminating the observation position of the microscope optical system.

According to the present invention, since the microscope-telescope combination is fitted with the illuminating apparatus comprising the telescope optical system, the auxiliary objection lens for forming the microscope optical system is arranged as to be projected into and/or retracted from the front of said objective lens of said telescope optical system, and the light source is supported so that its illuminaing direction is changeable to the first direction parallel to the optical axis of said telescope optical system and to the second direction directing toward the observation position of said microscope optical system. It is possible to provide the microscope-telescope combination fitted with the illumination apparatus which has a compact and simple structure and is effectively applicable both as the illumination for the microscope and the flashlight.

Also according to the present invention, since the microscope-telescope combination fitted with the illuminating apparatus comprises the telescope optical system, the auxiliary objection lens for forming the microscope optical system is arranged to be projected into and retracted from the front of said objective lens of said telescope optical system. The light source is for illuminating the observation position of said microscope optical system; therefore, the hood is fitted with the magnifier arranged in front of said objective lens. It is possible to effectively carry out the observation at lower magnification than the microscope by using the magnifier integrally formed in the hood.

I claim:

1. A microscope-telescope combination comprising:

a telescope optical system having an optical axis and a primary objective lens arranged on said optical axis;

an auxiliary objective lens movable between a first position on said optical axis projecting in front of said primary objective lens and a second position out of said optical axis retracted away from said primary objective lens, said auxiliary objective lens in said first position forming with said telescope optical system a microscope optical system; and a lamp having an illuminating direction, said lamp being spaced from said optical axis and movable to change said illuminating direction from a first direction parallel to said optical axis to function as a flashlight to at least a second direction intersecting said optical axis to illuminate a specimen placed along said optical axis.

2. The microscope-telescope combination of claim 1, wherein said telescope optical system further has an erect focusing lens movable along said optical axis.

3. The microscope-telescope combination of claim 1, further comprising a power source electrical terminal for contacting a power source and a lamp support, said lamp having a lamp electrical terminal and said lamp support supporting said lamp for movement of said illuminating direction, and said lamp electrical terminal being slidable on said power source electrical terminal.

4. The microscope-telescope combination of claim 1, further comprising a condenser lens, wherein said lamp is fitted with said condenser lens.

5. The microscope-telescope combination of claim 1, wherein said lamp is movable to change said illuminating direction from said first direction to a plurality of other directions intersecting said optical axis, said plurality of other illuminating directions varying within a predetermined range of angles relative to said optical axis.

6. A microscope-telescope combination comprising:

a telescope optical system having a primary optical axis and a primary objective lens arranged on said primary optical axis;

an auxiliary objective lens movable between a first position on said primary optical axis projecting in front of said primary objective lens and a second position out of said primary optical axis retracted away from said primary objective lens, said auxiliary objective lens in said first position forming with said telescope optical system a microscope optical system, and said auxiliary lens having a first side facing said primary objective lens and a second side facing an object to be examined using said microscope optical system;

a light source having an illuminating direction intersecting said primary optical axis to illuminate a specimen placed along said primary optical axis; and a hood arranged in front of said second side of said auxiliary objective lens, said hood having a magnifier fitted therein, said magnifier having a secondary optical axis different from said primary optical axis.

7. The microscope-telescope combination of claim 6, wherein said magnifier comprises a double lens magnifier, and wherein said secondary optical axis lies in a plane perpendicular to said primary optical axis.

* * * * *